(No Model.) 2 Sheets—Sheet 1.
F. KREIN & J. FLAIG.
DIE FOR WELDING AND SWAGING LINKS.
No. 445,346. Patented Jan. 27, 1891.
Fig. I.
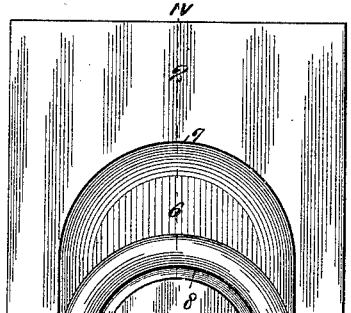
Fig. II.
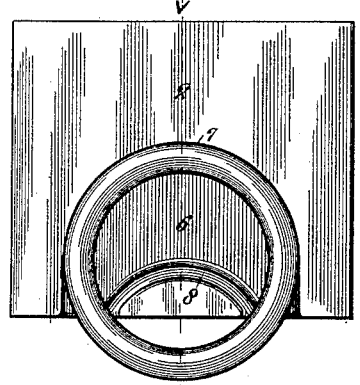
Fig. III.
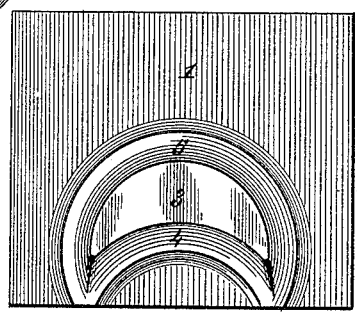
Fig. IV.
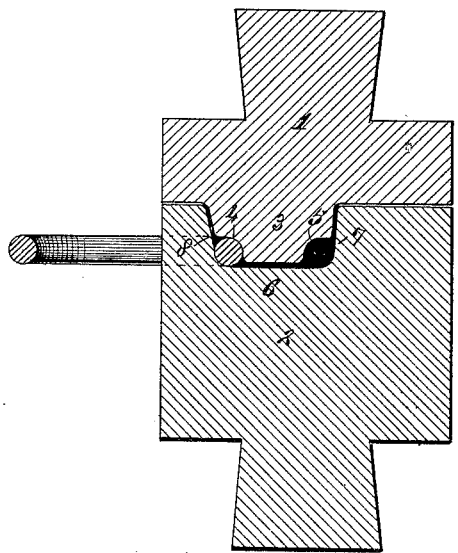
Fig. V.
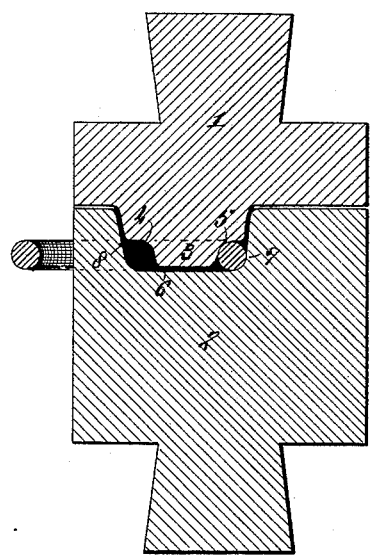
Attest:
Emma Arthur
Geo. E. Cruse
Inventors:
Franz Krein
Joseph Flaig
By Knight Bro attys (No Model.) 2 Sheets—Sheet 2.
F. KREIN & J. FLAIG.
DIE FOR WELDING AND SWAGING LINKS.
No. 445,346. Patented Jan. 27, 1891.
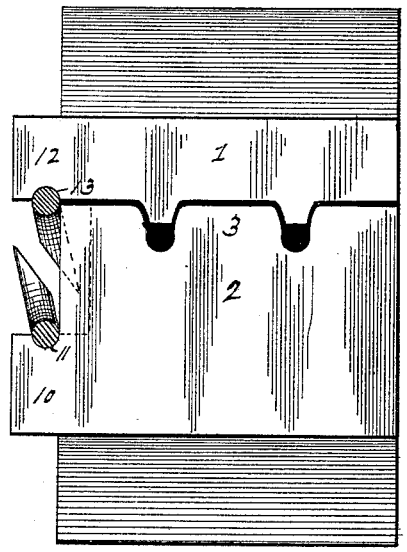
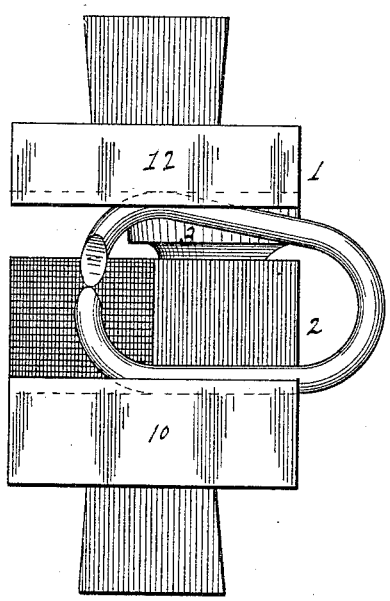
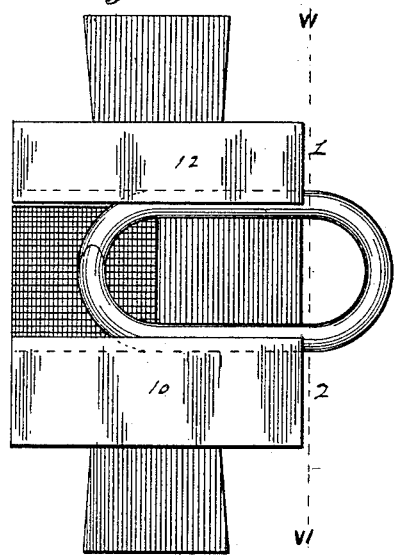
Attest:
Emma Arthur
Geo. E. Cruse
Inventors:
Franz Krein
Joseph Flaig
By Knight Bros
Attys

UNITED STATES PATENT OFFICE.

FRANZ KREIN AND JOSEPH FLAIG, OF ST. LOUIS, MISSOURI.

DIE FOR WELDING AND SWAGING LINKS.

SPECIFICATION forming part of Letters Patent No. 445,346, dated January 27, 1891.

Application filed June 4, 1890. Serial No. 354,267. (No model.)

*To all whom it may concern:*

Be it known that we, FRANZ KREIN and JOSEPH FLAIG, both of the city of St. Louis, in the State of Missouri, have invented a certain new and useful Improvement in Dies for Welding and Swaging Links, of which the following is a full, clear, and exact description, reference being had to the accompanying drawings, forming part of this specification.

Our invention relates to an improved die for welding and swaging links or rings; and our invention consists in features of novelty hereinafter fully described, and pointed out in the claims.

Figure I is a view of one member of the die, showing the link or ring in one of its positions for welding and swaging. Fig. II is a similar view showing the link or ring in its other position. Fig. III is a face view of the other member of the die. Fig. IV is a section taken on line IV IV, Fig. I. Fig. V is a section taken on line V V, Fig. II. Fig. VI is a front elevation of the die, showing how a link may be closed before being welded, the link being shown in section on line VI VI, Fig. VIII. Figs. VII and VIII are side views of the die, illustrating the same feature as Fig. VI, Fig. VII showing the two members of the die separated, and Fig. VIII showing them closed.

Referring to the drawings, 1 represents the male and 2 the female member of the die. The member 1 is provided with a projection 3, having an outer concave surface 4 and an inner concave surface 5. The surfaces 4 and 5 are made in the form of a segment of a circle, or other form, according to the shape of the link or ring to be welded.

The member 2 of the die has a recess 6, back of which is a shoulder 7 and forward of which is a shoulder 8. The recess 6 receives the projection 3 of the member 1 of the die. The face of the shoulder 6 is convex in form and the face of the shoulder 7 concave in form, as shown in Figs. I and II. They are made in the form of a segment of a circle or other form, to suit the shape of the link or ring to be swaged or welded.

In use the dies are of course suitably supported, one of them, preferably the female member, being permanently secured to a suitable bed and the other member being secured to a suitably-operated head, which causes it to move to and from the fixed member.

In Figs. VI, VII, and VIII we have shown the lower die provided with a ledge or extension 10, preferably formed with a groove 11. The upper die is provided with an extension or ledge 12, overhanging the ledge 10 of the lower die, and which may be provided with a groove 13.

The operation is as follows: The link or ring after being heated is placed between the projections 10 and 12, as shown in Figs. VI to VIII, which closes it, as shown in Figs. VI and VIII. It is then placed with its part to be welded against the shoulder 8. The member 1 of the die then descends upon the part of the link or ring to be welded, as shown in Fig. IV. The movable member then rises again and the link or ring is forced back against the shoulder 7, as shown in Fig. II, and then the die again descends upon the link or ring, as shown in Fig. V. This operation is repeated once or twice, when the link or ring will be thoroughly welded and swaged, the link or ring being moved each time the movable die rises from the shoulder 8 to the shoulder 7, and vice versa.

By the use of a die thus formed the link or ring is swaged and welded without taking it from the die, and by a simple inward and outward thrust, which can be performed by a person with little or no experience, all that is necessary being for him to move the link or ring back and forth against the shoulders 7 and 8.

We claim as our invention—

1. The improved die for welding and swaging, consisting of two members, one of said members having a recess forming inner and outer shoulders and the other member having a projection provided with inner and outer recesses, substantially as and for the purpose set forth.

2. The improved die for welding and swaging, consisting of the member 1, having a projection 3, with the concave recesses 4 5, and the member 2, having a recess 6, forming shoulders 8 7, substantially as and for the purpose set forth.

3. The improved die for welding links, &c., having the projections 10 and 12 on its respective members for closing the links, substantially as shown and described.

4. The improved die for welding links, &c., having a grooved projection 10 on its lower member and a ledge 12 on its upper member, substantially as and for the purpose set forth.

FRANZ KREIN.
JOSEPH FLAIG.

In presence of—
E. S. KNIGHT,
A. M. EBERSOLE.